United States Patent [19]
Fukuzawa

[11] Patent Number: 5,569,394
[45] Date of Patent: Oct. 29, 1996

[54] ELECTRIC DISCHARGE MACHINING METHOD FOR INSULATING MATERIAL USING ELECTROCONDUCTIVE LAYER FORMED THEREON

[75] Inventor: Yasushi Fukuzawa, Tokyo, Japan

[73] Assignee: Research Development Corporation of Japan, Japan

[21] Appl. No.: 492,671

[22] Filed: Jun. 20, 1995

[30] Foreign Application Priority Data

Jun. 20, 1994 [JP] Japan ................................ 6-160693

[51] Int. Cl.⁶ .................... B23H 1/00; B23H 9/00
[52] U.S. Cl. ........................ 219/69.17; 219/69.15
[58] Field of Search ................... 219/69.17, 69.12, 219/69.13, 69.15

[56] References Cited

U.S. PATENT DOCUMENTS

| | | | |
|---|---|---|---|
| 3,723,690 | 3/1973 | Nakada et al. | 219/69.17 |
| 4,847,463 | 7/1989 | Levy et al. | 219/69.17 |
| 4,855,557 | 8/1989 | Denny | 219/69.15 |

FOREIGN PATENT DOCUMENTS

| | | | |
|---|---|---|---|
| 59-53123 | 3/1984 | Japan | 219/69.17 |
| 61-168422 | 7/1986 | Japan | 219/69.17 |
| 61-219523 | 9/1986 | Japan | 219/69.17 |
| 63-150109 | 6/1988 | Japan | 219/69.17 |
| 1-92026 | 4/1989 | Japan | 219/69.17 |
| 4-41120 | 2/1992 | Japan . | |
| 5-208323 | 8/1993 | Japan | 219/69.17 |
| 7-136849 | 5/1995 | Japan . | |

*Primary Examiner*—Geoffrey S. Evans
*Attorney, Agent, or Firm*—Webb Ziesenheim Bruening Logsdon Orkin & Hanson, P.C.

[57] ABSTRACT

An insulating material is electric discharge machined with high dimensional accuracy at a high speed, by closely adhering mesh-shaped electroconductive material 5 onto the surface of an insulating material 1 so as to form an electroconductive layer 6 at the initial stage of electric discharge. In the advancement of electric discharge, fresh electroconductive layers 9, 10 are continuously formed at the bottom and the side surface of a hole 8, so that the electric discharge machining is continued even after the hole 8 becomes deeper. A porous preformed body composed of fine metal wires or a complex body containing needle metal may be used instead of the mesh-shaped electroconductive material 1. Thus, electric discharge machining is performed at a high speed, and a machined surface excellent in flatness can be obtained with high dimensional accuracy.

24 Claims, 8 Drawing Sheets

FIG. IA
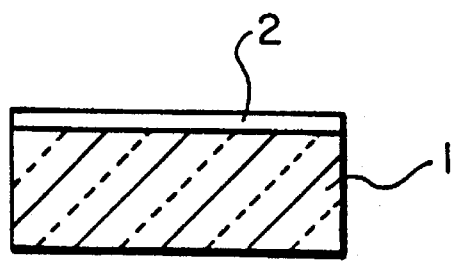
FIG. IB
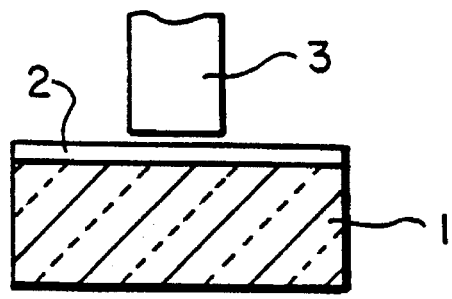
FIG. IC
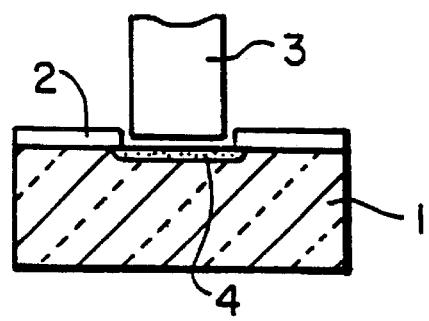
FIG. ID
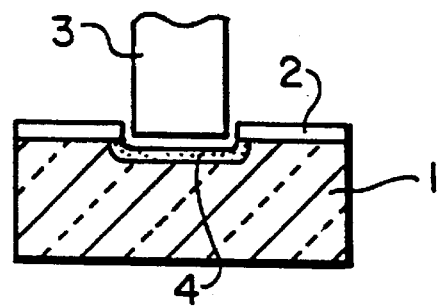
FIG. IE
(PRIOR ART)
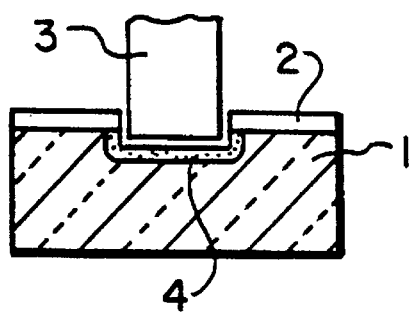

USE OF MESH – TYPE ELECTROCONDUCTIVE MATERIAL

USE OF PLATE—SHAPED ELECTROCONDUCTIVE MATERIAL

 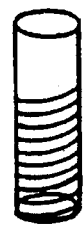  
FIG. 7A  FIG. 7C  FIG. 7E
FIG. 7B  FIG. 7D
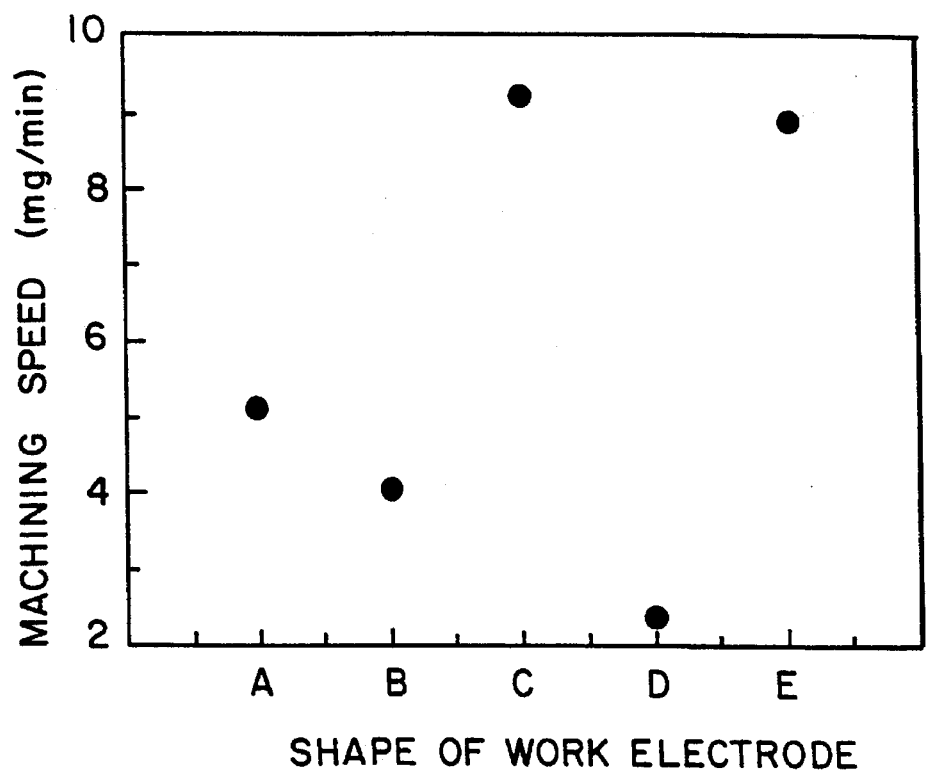
FIG. 8

ELECTRIC DISCHARGE MACHINING METHOD FOR INSULATING MATERIAL USING ELECTROCONDUCTIVE LAYER FORMED THEREON

BACKGROUND OF THE INVENTION

1. Field of the Invention

The present invention relates to an electric discharge machining method of machining or cutting an insulating material to a predetermined shape using an electroconductive layer formed thereon to promote electric discharge between the insulating material and a work electrode.

2. Description of the Prior Art

Since insulating materials such as ceramics show electrically insulating property, electric discharge necessary for machining does not occur. In order to electric discharge machine such an insulating material, it is necessary to form an electroconductive layer on the surface of the insulating material to be machined.

For instance, Japanese Patent Application Laid-Open 63-15010 discloses the method wherein electric discharge is generated between electrodes so as to deposit carbon particles or the like from a machining liquid. The deposited carbon is adhered onto the surface of an insulating material, or the insulating material is impregnated with the deposited carbon. Hereby, an electroconductive layer is formed on the surface of the insulating material.

Such an electroconductive layer useful for electric discharge machining may be formed by coating the insulating material with an electroconductive film, as disclosed in Japanese Patent Application Laid-Open 4-41120

According to the electric discharge machining method disclosed in Japanese Patent Application Laid-Open 63-150109, an insulating material 1 is coated with an electroconductive layer 2 such as Cu or Fe, as shown in FIG. 1(A). The electroconductive layer 2 may be formed by flame spraying or vapor deposition to 0.1–0.5 mm in thickness. The insulating material is then mounted on the table of an electric discharge machine, and secured onto the table with proper clamping means.

The insulating material is dipped in a machining liquid such as oil, and a potential for electric discharge machining is charged between the electroconductive layer 2 and a machining electrode 3 from a power source to start electric discharge machining, as shown in FIG. 1(B). At first, the electroconductive layer 2 is machined by the electric discharge, as shown in FIG. 1(C).

When the electroconductive layer 2 is removed at a part facing to the machining electrode 3, a fresh electroconductive layer 4 is formed on the exposed surface of the insulating material 1. The electroconductive layer 4 is caused by the deposition of machined chips formed by electric discharge machining and carbon or the like decomposed from the machining liquid by thermal energy during the electric discharge machining on the surface of the insulating material 1. The surface of the insulating material 1 may be partially impregnated with the depositions to form said electroconductive layer. The formation of the electroconductive layer 4 may be caused by the conversion of tile surface of the insulating material 1 to an electroconductive state by thermal energy during the electric discharge machining.

The electroconductive layer 4 is expanded during the advancement of the electric discharge machining. That is, the fresh electroconductive layer 4 is formed at the part facing to the work electrode 3 where the former electroconductive layer 2 is removed, so that the fresh electroconductive layer 4 is electrically connected continuously to the remaining electroconductive layer 2, as shown in FIG. 1(D).

Consequently, even at the part facing to the work electrode 3 where the original electroconductive layer 2 has been removed, the electric discharge is continued between the work electrode 3 and the electroconductive layer 4 which is repeatedly formed, so that the insulating material is machined to a predetermined shape, as shown in FIG. 1(E).

The method shown in FIG. 1 requires special equipment and steps, resulting in the rising of machining cost, in order to preform the electroconductive layer 2 on the surface of the insulating material 1 to be machined. The electroconductive layer 4 is formed to sufficient thickness in the case of relatively shallower machining, However, when the machining depth reaches a few mm, the electroconductive layer 4 is not formed to sufficient thickness enough to continue the electric discharge machining. Hereby, there is a restriction on the depth to be formed by said method.

In order to avoid the restriction on the machining depth, we have proposed a new method as disclosed in Japanese Patent Application 5-286769. According to the proposed method, insulating and electroconductive materials are used as coupled workpieces, and the materials are electric discharge machined while relatively shifting a work electrode along a direction parallel to the matching face between the materials.

In this case, electric discharge is generated between the electroconductive material and the work electrode at first. The insulating material is machined by thermal effect at the part closest to the electroconductive material, and a component of the work electrode is transferred to said part. Other electric discharge is generated between the transferred part and the work electrode, so that the insulating material is machined by the impact of the electric discharge and the thermal effect. Due to the repetition of said generation of electric discharge and the transfer of the electrode component, the insulating material can be machined to a predetermined shape without any restriction on machining depth.

According to the former proposed method, the electroconductive layer necessary for the continuation of electric discharge machining is formed on the surface of the insulating material, even when the insulating material is machined with large depth. However, the formation of the electroconductive layer is not so rapid, since the reactions to transfer the electroconductive material and to deposit the electroconductive material from the machining liquid are relatively slow. Herein, it is necessary to machine the insulating material until the formation of the electroconductive layer having sufficient thickness, so that the insulating material is inevitably machined at a low speed. If the machining speed is elevated, there appears the tendency to reduce machining accuracy. In addition, the machining conditions are complicated and difficult to control, since the work electrode is necessarily carried along the direction parallel to the matching face of the materials.

SUMMARY OF THE INVENTION

The present invention is aimed at eliminating the problems in the former proposed electric discharge machining method. The object of the present invention is to accelerate the formation of an electroconductive layer having sufficient thickness on the surface of an insulating material by use of a mesh-shaped electroconductive material or the like as an electroconductive layer-forming source. The other object of the present invention is to electric discharge machine the insulating material at high speed with high accuracy.

According to the present invention, there is provided the electric discharge machining method characterized by providing a mesh-shaped electroconductive material, a porous preformed body composed of fine metal wires or a complex body containing needle metal in close contact with the surface of an insulating material. A work electrode is provided at a position facing to the insulating material through the electroconductive layer. Under this condition, the insulating material is machined by electric discharge generated between the work electrode and the electroconductive layer. The mesh-shaped electroconductive material may be provided between the insulating material and a solid electroconductive material.

BRIEF DESCRIPTION OF DRAWINGS

FIG. 1 is an illustration for explaining the step-by-step reactions of electric discharge machining an insulating material on which an electroconductive layer is provided according to a conventional method.

FIG. 7 is a view for illustrating various work electrodes, used in Example 3 of the present invention, having top ends different in configuration.

FIG. 8 is a graph for illustrating the effect of the top end configuration of work electrodes on a machining speed.

DETAILED DESCRIPTION OF THE INVENTION

Figure 2A:
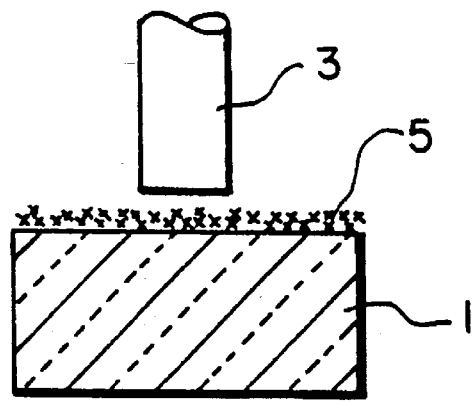
FIG. 2 is an illustration for explaining the step-by-step reaction of electric discharge machining an insulating material onto which a mesh-shaped electroconductive material is closely adhered.

Cu, Ni, W, Nb or their alloys excellent in electroconductivity may be used as the mesh-shaped electroconductive material, the fine metal wires of the porous preformed body or the needle metal of the complex body. The electroconductive material is secured onto the surface of the insulating material by mechanical bonding, adhesion, soldering or the like. Hereon, it is necessary to closely adhere the mesh-shaped electroconductive material onto the surface of the insulating material, in order to assure the generation of electric discharge between the insulating material and the work electrode. If there is a gap between the insulating material and the mesh-shaped electroconductive material, the electric discharge generated between the insulating material and the work electrode would be unstable so as to reduce machining accuracy or speed.

The use of the mesh-shaped electroconductive material facilitates the formation of the electroconductive layer having sufficient thickness, as compared with the electroconductive layer formed on the surface of the insulating material by flame spraying or vapor deposition. For instance, in order to form an electroconductive layer of approximately 500 μm in thickness, the flame spraying or vapor deposition requires long-term treatment and complicated condition control. As a result, it is difficult to form the electroconductive layer, and the machining cost is high. In this regard, the electrocondutive layer having sufficient thickness can be easily formed on the surface of the insulating material by using the mesh-shaped electroconductive material.

The mesh-shaped electroconductive material is preferably of 100 meshes or finer in order to maintain a good electroconductive layer on the surface of the insulating material during electric discharge machining. The mesh-shaped electroconductive material of 100 meshes or finer effectively reduces the ruggedness of the machined insulating material and improves machining accuracy, too.

For the same purpose, it is preferable to laminate 10 sheets or less of mesh-shaped electroconductive material having a thickness of 0.1 mm or less and to closely adhere the laminated sheets onto the surface of the insulating material.

The lamination number is inversely proportional to the diameter of fine metal wires to be used. When the metal wires to be used have a larger diameter, the lamination number shall be smaller. However, the excessively small lamination number does not sufficiently fulfill the effect of the mesh-shaped electroconductive material on the improvement of machining accuracy. However, when the lamination number exceeds 10 sheets, there is the tendency to reduce the machining speed as compared with the electric discharge machining method using a solid electroconductive material.

The lamination of 5 sheets or so is most effective in the case using a mesh-shaped electroconductive material of 100 meshes or finer prepared by wires of 0.1 mm in diameter made of Cu, Ni, W, Nb or their alloy. When metal wires of 0.5 mm in diameter are used, the lamination of 3 sheets or so is effective. In the relation with the kind of the insulating material, only one sheet of the mesh-shaped material can afford sufficient results, too.

According to the present invention, the mesh-shaped electroconductive material serves as a source for forming an electroconductive layer necessary for electric discharge machining an insulating material. Electroconductive substances transferred to the insulating material are captured by the mesh structure. Consequently, the insulating material can be easily electric discharge machined at a high speed, even if its electric resistivity exceeds 100 Ω·m. The insulating material to be machined according to the present invention may be ceramics, high-molecular compounds, a Si wafer, a bonded metal-insulating ceramics body, a compressed body of insulating powder or monofilaments, or the composite of metal, high-molecular compound or ceramics complexed with insulating powder or monofilaments.

An electrode having a top end formed to a flat, drill-shape or tapered is used as a work electrode, in order to machine an insulating material to a predetermined shape. The electrode preferably has straight grooves parallel to the axial direction of the electrode or spiral grooves crossing said axial direction, in order to discharge machined chips or used machining liquid from the machining region during electric discharge machining.

The electric discharge machining is performed while rotating or obitally carrying the work electrode. For instance, when a work electrode having a drill-shaped top end is obitally carried toward the insulating material, the insulating material is screwed. During the machining, the polarity of the work electrode may be intermittently or continuously inversed in order to clean the surface of the insulating material in the machining region and to finish the surface of the insulating material to excellent flatness. When the work electrode is obitally carried along one direction parallel to the surface of the insulating material, an elliptic hole is formed in the insulating material. When the insulating material to be electric discharge machined is carried with respect to the work electrode, a predetermined shape is obtained in the same way as conventional electric discharge machining.

Figure 2B:
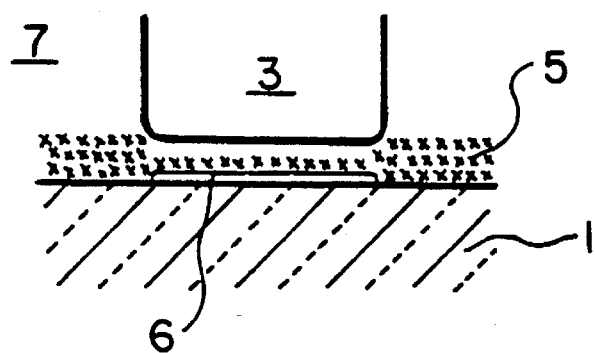
Figure 2C:
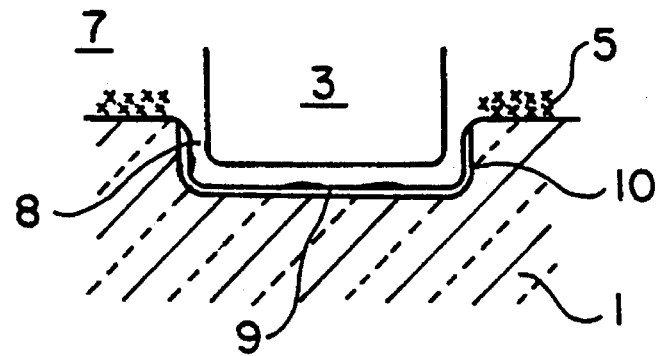

When the insulating material is electric discharge machined in the state to which the mesh-shaped electroconductive material is closely adhered, even a deep hole can be easily formed with high dimensional accuracy at a high speed. Although the function and effect of the mesh-shaped electroconductive material on the acceleration of machining and the improvement of machining accuracy are not clear, it is supposed that the machining speed and the machining accuracy may be improved due to the following reasons:

At first, the electric discharge is generated between a mesh-shaped electroconductive material 5 closely adhered to an insulating material 1 and a work electrode 3, as shown in FIG. 2(A). The mesh-shaped electroconductive material 5 is machined at the part facing to the work electrode 3 by the electric discharge, as shown in FIG. 2(B). Monofilament chips, spheroidal or oval chips, etc. formed during the electric discharge machining are peeled off the mesh-shaped electroconductive material 5 and adhere onto the surface of the insulating material 1 so as to form an electroconductive layer 6. This electroconductive layer 6 is formed in a very short time as compared with one derived from a solid electroconductive material in a conventional method. Consequently, electric discharge is generated between the insulating material 1 and the work electrode 3 at an earlier stage. Such the electroconductive layer 6 is formed in the same manner, when electric discharge is generated between the work electrode 3 and the insulating material 1 to which a porous preformed body composed of fine metal wires or a complex body containing needle metal is closely adhered.

Since the electric discharge region between the insulating material 1 and the work electrode 3 reaches a high temperature, a violent thermal convection is formed in a machining liquid 7 remaining in said region. Due to the convection, the machining liquid 7 is frequently replaced by the fresh machining liquid 7 which flows through the mesh-shaped electroconductive material 5. When the machining liquid 7 is circulated from the inside to the outside of the machining region, machined chips suspended in the machining liquid 7 are captured by the mesh-shaped electroconductive material 5 and held near the surface of the insulating material 7. Hereby, the growth of the electroconductive layer 6 is accelerated, too. The circulation of the machining liquid 7 effectively inhibits the excessive heating of the machining region. That is, the insulating material 1 is held within a predetermined temperature range during the electric discharge machining. As a result, machining conditions are stabilized so as to inhibit uneven machining.

Since the electric discharge is generated between the insulating material 1 and the work electrode 3 through the electroconductive layer 6 which grows to sufficient thickness in a short time, the machining of the insulating material 1 is initiated at the earlier stage. In addition, the formed electroconductive layer 6 derived from the mesh-shaped electroconductive material 5 is uniformly formed on the surface of the insulating material 1 facing to the work electrode 3. Consequently, the electric discharge is made uniform at the part facing to the work electrode 3, so that the insulating material 1 is uniformly electric discharge machined.

Since there are a lot of cavities in the mesh-shaped electroconductive material 5, the mesh-shaped electroconductive material 5 exhibits relatively low thermal conductivity as a whole, compared with a solid metal plate. Therefore, the mesh-shaped electroconductive material 5 is rapidly heated at a high temperature and acceleratively consumed. Due to the consumption of the mesh-shaped material 6, the chips existent between the electrodes is increased in amount, and the powder transferred and adhered onto the insulating material 1 is increased in amount, too. Consequently, a film which will grow to the electroconductive layer 6 is formed in a short time.

When the insulating material 1 is electric discharge machined under the condition that the mesh-shaped electroconductive material 5 is closely adhered onto the insulating material 1, machined chips are formed having a configuration of large carvature compared with a solid plate, so that the graduation of potential between the electrodes becomes larger. The large graduation of potential accelerates the electric discharge even when a distance between the electrodes is longer, so that the machining can be continued for a long time. In addition, a skin effect occurs where the electric discharge current flows only through the part where the electroconductive layer 6 is adhered, so that the electric discharge machining is smoothly promoted without the impedance caused by the larger electric resistivity of the insulating material 1 itself. The skin effect occurs in the case using a solid metal plate, too. However, when the mesh-shaped electroconductive material 5 as well as a porous preformed body composed of fine metal wires or a complex body containing needle metal is applied onto the insulating material 1, the skin effect is made larger so as to effectively adhere the electroconductive layer 6 onto the surface of the insulating material 1.

As the electric discharge machining advances, a hole 8 is formed on the surface of the insulating material 1 at the position facing to the work electrode 3. Even at this stage, a lot of monofilament chips peeled off the mesh-shaped electroconductive material 5 are suspended in the machining liquid 7 near the surface of the insulating material 1. The monofilament chips are adhered onto the bottom and side surfaces of the hole 8 by the discharge impact and thermal energy, so as to form fresh electroconductive layers 9 and 10. The electroconductive layer 9 is electrically connected with the mesh-shaped electroconductive material 5 remaining on the surface of the insulating material 1 through the electroconductive layer 10 deposited on the side surface of the hole 8. As a result, the insulating material 1 is electric discharge machined without any restriction caused by the depth of the hole 8. In addition, the electroconductive layers 9 and 10 are formed uniformly on the bottom and the side surface of the hole 8, respectively, so that the hole 8 is formed with high dimensional accuracy, and that the side surface of the hole 8 is made smooth.

EXAMPLE

Example 1

Figure 3:
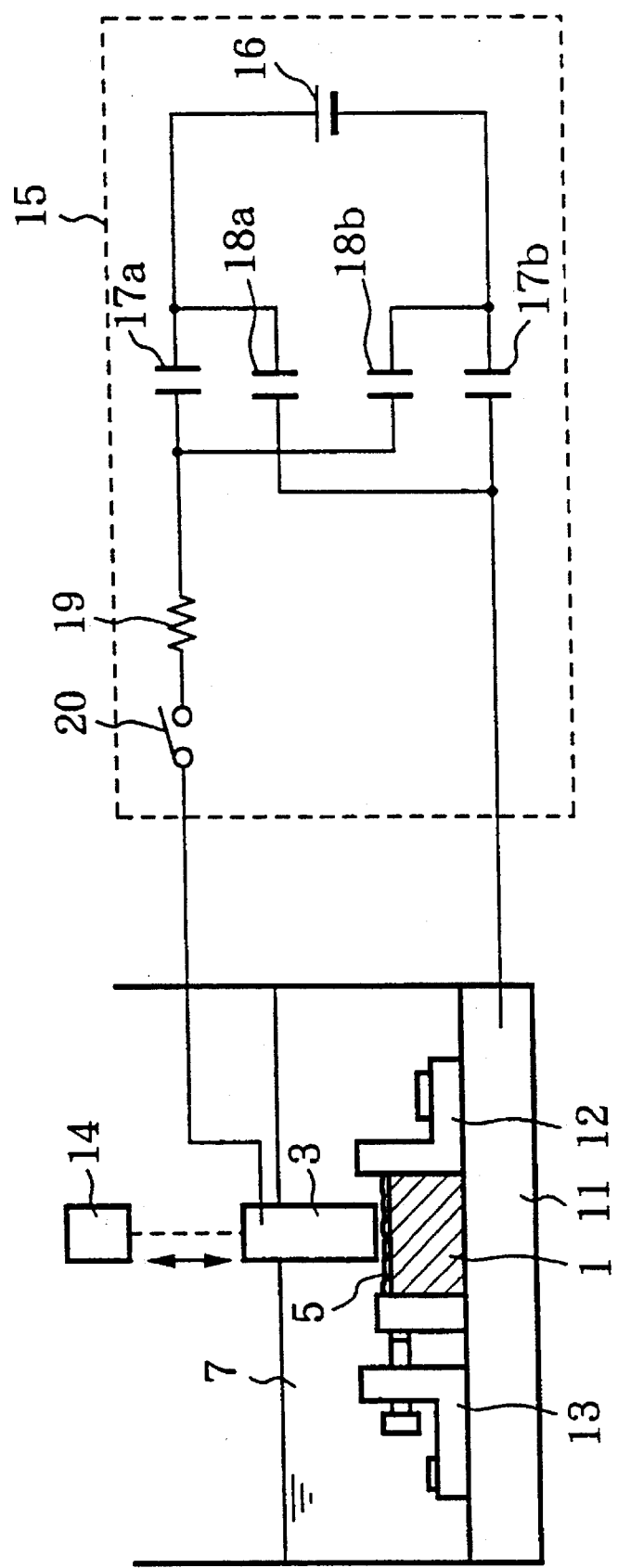
FIG. 3 is a schematic view illustrating an electric discharge machining apparatus used in the example of the present invention.

In this example, SIALONE was electric discharge machined as an insulating material 1 using an apparatus shown in FIG. 3.

After a mesh-shaped electroconductive material 5 was closely adhered onto the insulating material 1, the insulating material 1 was mounted on a work table 11 and clamped by pressing it onto a fixing jig 12 with a pressing tool 13. The insulating material 1 was then dipped in a machining liquid 7 and located at the position facing to a work electrode 3 capable of vertical motion with an axis-Z motor 14.

One terminal of a power supply source 15 was connected to the mesh-shaped electroconductive material 5 on the insulating material 1 through the work table 11, the jig 12 and the tool 13. The other terminal of the source 15 was connected to the work electrode 3. The circuit in which contactors 17, 17a and 18, 18a, for inversing the polarity of a D.C. power source 16, was used as the power supply source 15. In FIG. 3, the numeral 19 represents a resitance, and the numeral 20 represents a switch.

An electric current of 20 A is applied by charging a potential of 200 V between the electrode 3 as a cathode and the mesh-shaped electroconductive material 5. Hereby, electric discharge was generated between the electrode 3 and the mesh-shaped electroconductive material 5, and the electric discharge machining was initiated.

Under these conditions, the effect of the lamination number of the mesh-shaped electroconductive material 5 closely adhered onto the insulating material 1 on the machining speed was investigated. The mesh-shaped electroconductive material 5 was prepared by composing Cu wires of 0.1 mm in diameter to 100 meshes and 0.1 mm in average thickness.

Figure 4:
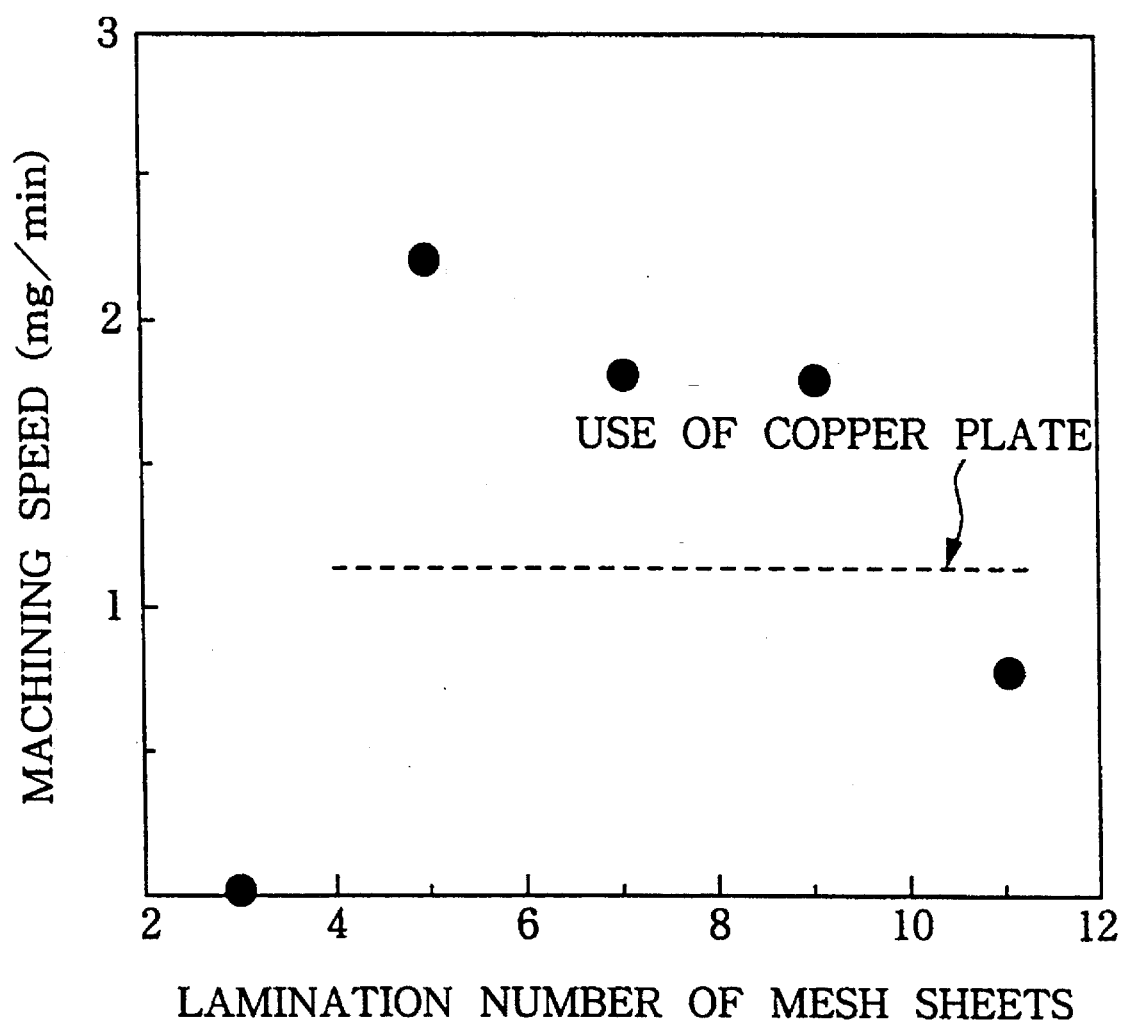
FIG. 4 is a graph for illustrating the effect of the lamination number of an electroconductive material closely adhered onto an insulating material on a machining speed.

The result is shown in FIG. 4, wherein the pulse duration was set in the intervals of 16 μsec. on-time and 16 μsec. off-time, respectively, per one cycle, i.e. the duty factor (D.F.) of discharge (=discharge period/discharge period+rest period) being set at 50%. When the on-time was 4μsec, the maximum machining speed was obtained. However, the surface formed by machining under the condition of the 4 μsec. on-time was rugged, and fine cracks were formed in the machined surface layer of the insulating material. In this concern, a preferable on-time period was 16 μsec., whereby the machined surface was relatively flat.

It is apparently noted in FIG. 4 that the insulating material 1 to which 3–9 sheets of the mesh-shaped electroconductive material 5 was closely adhered was electric discharge machined at 1.5 times high machining speed compared with the case of machining an insulating material on which a Cu plate was mounted. The insulating material to which 5 sheets of the mesh-shaped electroconductive material 5 were laminated was machined at a speed of 2 times or higher. Thus, the effect of the mesh-shaped electroconductive material 5 is recognized. However, when only one sheet of the mesh-shaped electroconductive material 5 was laminated, or when 11 sheets of the mesh-shaped electroconductive material 5 were laminated, the machining speed was lowered on the contrary. This effect means that the lamination number of the mesh-shaped electroconductive material 5 shall be maintained within a proper range in order to form effective electroconductive layers 6, 9 and 10.

When the surface of the insulating material 1 after being machined was observed, said surface was flat with very small ruggedness compared with the machined surface of an insulating material on which a Cu plate was mounted, as shown in Table 1. In Table 1, $R_{max}$ means the difference between the maximum ruggedness and the minimum ruggedness, $R_a$ means averaged ruggedness, and $R_z$ means a value obtained by averaging the maximum ruggedness at 5 points with the minimum ruggedness at 5 points.

TABLE 1

EFFECT OF KIND OF ELECTROCONDUCTIVE MATERIAL ON RUGGEDNESS OF SURFACE AFTER BEING MACHINED

| | MESH-SHAPED ELECTRO-CONDUCTIVE MATERIAL | PLATE-SHAPED ELECTRO-CONDUCTIVE MATERIAL |
|---|---|---|
| $R_{max}$ (μm) | 15.72–23.35 | 73.7 |
| $R_a$ (μm) | 2.90–4.20 | 7.8 |
| $R_z$ (μm) | 13.56–16.88 | |

Example 2

Figure 5A:
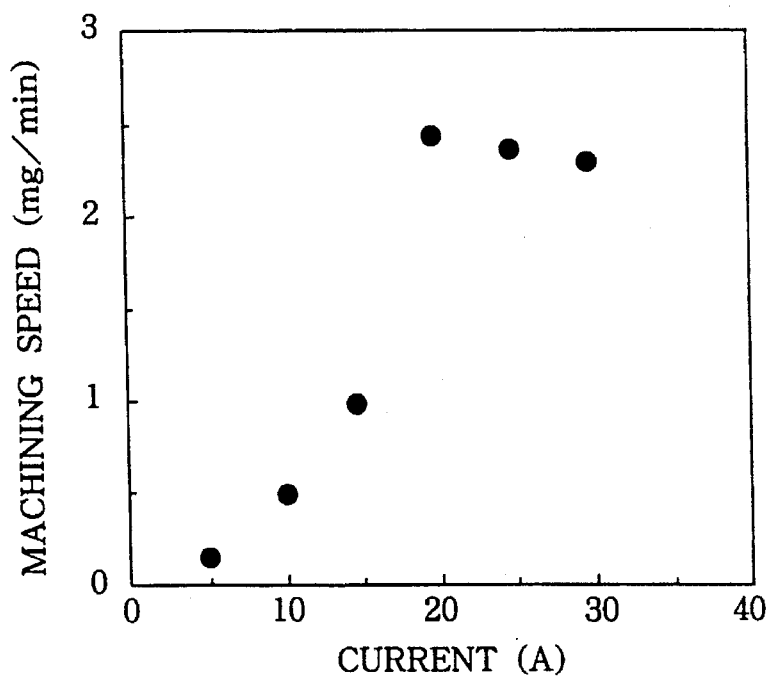
FIG. 5(A) is a graph for illustrating the effects of an electric current on machining speed in the case of electric discharge machining of the insulating material onto which a mesh-shaped electroconductive material is closely adhered.

The effect of electric discharge conditions on machining speed was researched using the same apparatus as that in Example 1. SIALONE onto which 5 sheets of mesh-shaped electroconductive material prepared by composing Cu wires of 1 mm in diameter to 10 meshes were laminated was used as a material to be electric discharge machined. The machining speed was varied in response to electricity and discharge period, as shown in FIG. 5(A) wherein a discharge period was set at 16 μsec. and in FIG. 5(B) wherein an electric current was adjusted at 20 A. In any case, the duty factor D.F. of electric discharge was set at 50%. For comparison, SIALONE on which a Cu plate of 5 mm in thickness was mounted was electric discharge machined under the same conditions. The machining speed in this case is shown in FIG. 6.

Figure 5B:
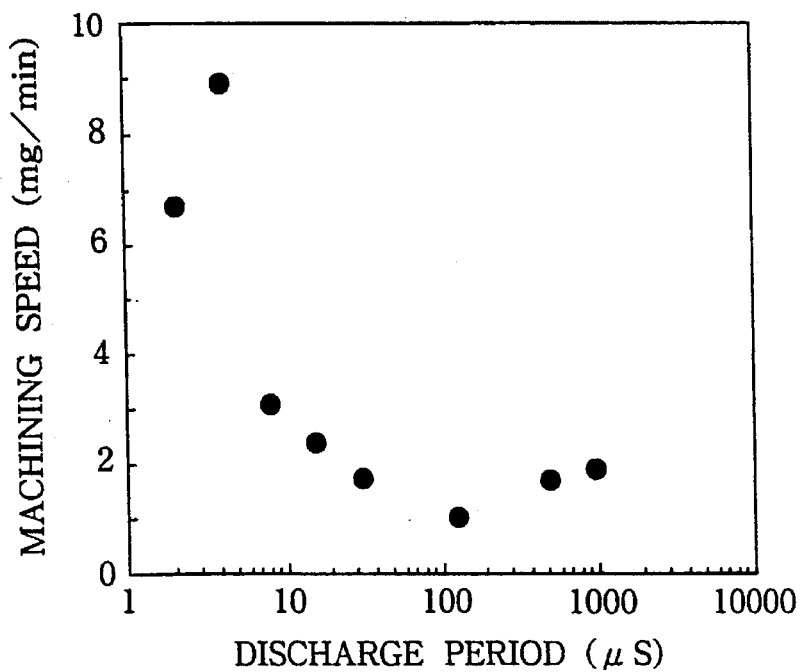
FIG. 5(B) is a graph for illustrating the effects of discharge period on machining speed in the same case.
Figure 6A:
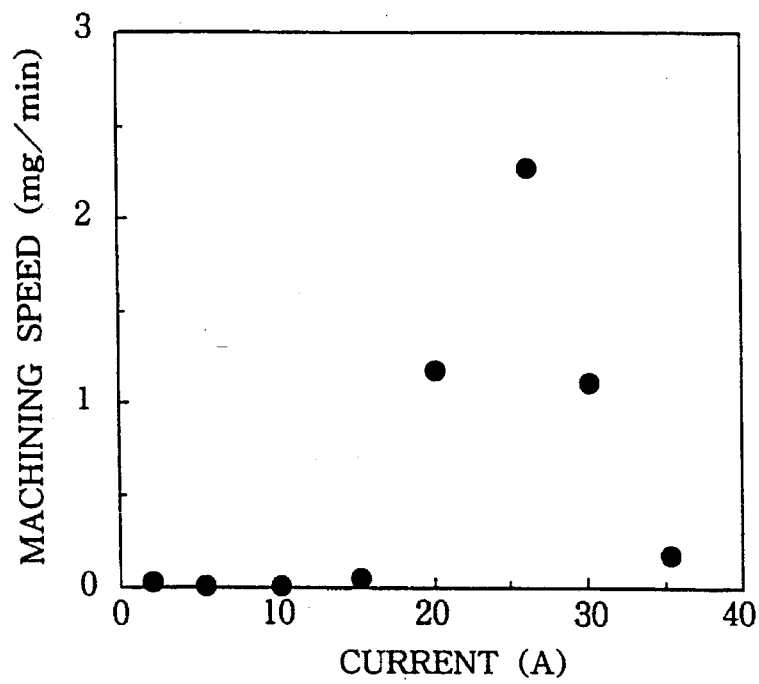
FIG. 6(A) is a graph for illustrating the effects of an electric current on machining speed in the case of electric discharge machining the insulating material on which a Cu plate is mounted.
Figure 6B:
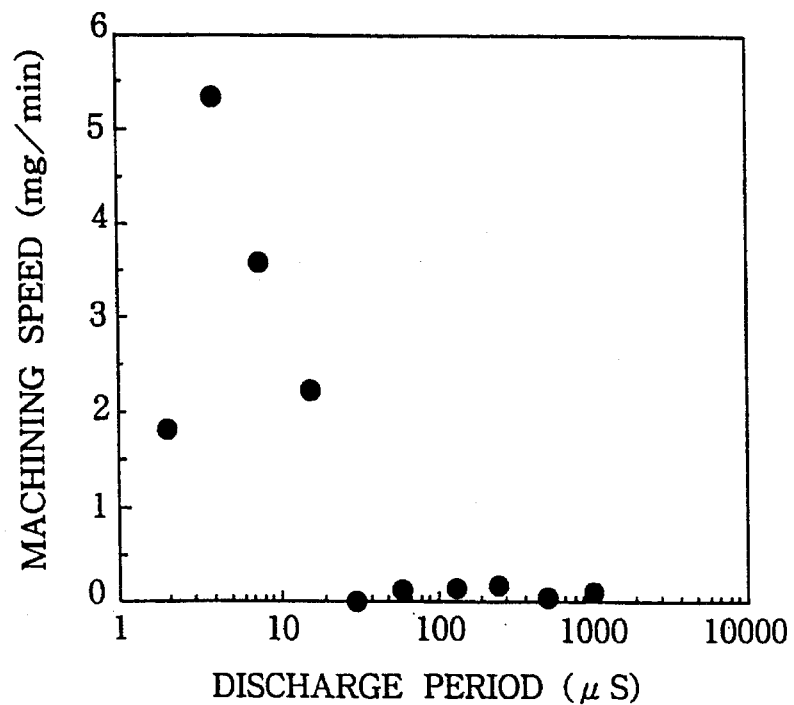
FIG. 6(B) is a graph for illustrating the effects of a discharge period on a machining speed in the same case.

It is apparently noted from the comparison of FIGS. 5(A) and 5(B) with FIG. 6 that the electricity and the discharge period for obtaining the maximum machining speed were within the approximately same range. However, the region capable of machining in the case using the mesh-shaped electroconductive material 5 as shown in FIGS. 5(A) and 5(B) is broader than the region shown in FIG. 6. The broader region means the machining conditions can be determined with the higher degree of freedom in the case using the mesh-shaped electroconductive material 5 closely adhered onto the insulating material 1. In addition, the machining speed at the most preferable point was 2 times higher.

Example 3

The effect of the configuration of a work electrode on the machining speed was examined. Five electrodes shown in FIG. 7 were tested as the work electrodes, i.e. a rod (A) of 5 mm in diameter, a rod (B) of 5 mm in diameter having straight grooves formed in its top end, a rod (C) of 5 mm in diameter having the top end where screws of M5 were engraved with pitches of 0.8 mm, a rod (D) of 5 mm in diameter having a top end tapers with the angle of 8 degrees and a flask-shaped electrode (E). SIALONE onto which the same mesh-shaped electroconductive material as that in Example 1 was closely adhered was set at the position facing to each electrode, and electric discharge machined under the conditions of electric current of 20 A, an on-time period 16 μsec. and D.F.=50%.

The machining speed was measured at each work electrode. The results are shown in FIG. 8. It is noted from FIG. 8 that the highest machining speed was obtained in the case using the electrode C. In the case using the electrode D having the tapered top end, the machining speed was very slow. The difference in the machining speed means that the electrode C effectively promotes the flow of the machining liquid along the dents of the screws, while the electrode D impedes the circulation of the machining liquid at the part having large diameter. A high machining speed was obtained in the case using the flask-shaped electrode E, too.

It is noted from the relationship of the configuration of the work electrode with the machining speed that the use of the work electrode having the top end configuration suitable for the smooth circulation of the machining liquid from the inside to the outside of the electric discharge region between the insulating material as a workpiece and the work electrode is effective for the high-speed machining.

Example 4

The effect of the electric resistivity of the insulating material on the machining speed was researched using a TiN-Al$_2$O$_3$ composite material as the insulating material. The electric resistivity of the insulating material was adjusted by changing the composition of the composite material.

The electric discharge machining was performed under the conditions of an electric current of 5 A, a discharge period of 5 μsec. and a rest period 16 μsec. using a Cu rod of 1 mm in diameter as the work electrode. The results are shown in FIG. 9.

Figure 9:
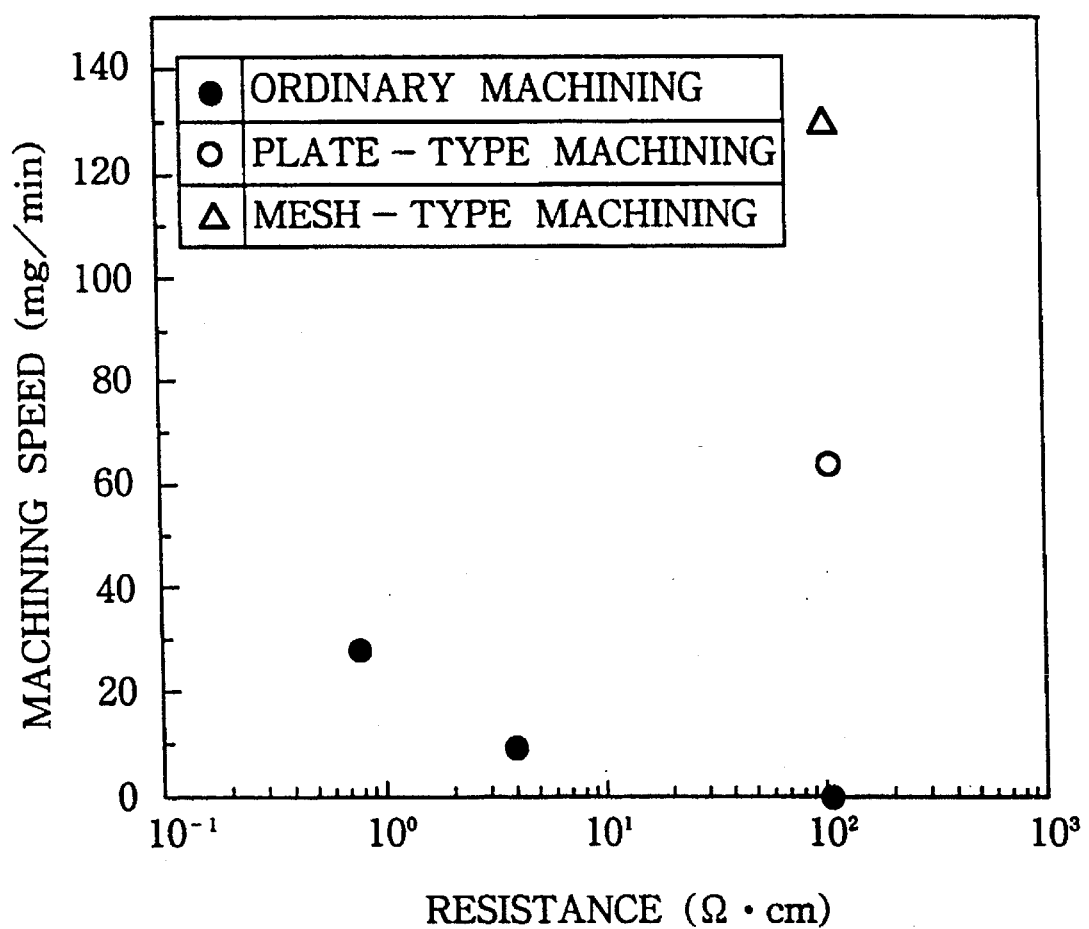
FIG. 9 is a graph for illustrating the relationship between the electric resistivity of an insulating material and a machining speed.

It is noted in FIG. 9 that the naked TiN-Al$_2$O$_3$ composite material was difficult to electric discharge machine in a conventional method, although the composite material was machined to some extent in the region where its resistivity was lower. When the same material having a Cu plate of 5 mm in thickness mounted thereon was electrtic discharge machined, a machining speed of 70 μm/min. was obtained in the case of resistivity of 100Ω·m.

On the other hand, in the case of machining the TiN-Al$_2$O$_3$ composite material onto which 5 sheets of the mesh-shaped electroconductive material prepared by composing Cu wires of 100 meshes were closely adhered, 2 times or much higher machining speed was obtained even when the resistivity was the same 100Ω·m.

According to the present invention as above mentioned, an insulating material is electric discharge machined in the state that a mesh-shaped electroconductive material, i.e. a porous preformed body composed of fine metal wires, a complex body containing needle metal or the like, is closely adhered onto the surface of the insulating material. The mesh-shaped electroconductive material facilitates the initiation of electric discharge machining and enables the electric discharge machining of the insulating material which could not be machined by a conventional method due to its high resistivity. In addition, the machined surface of excellent smoothness is obtained at a high machining speed. Consequently, various kinds of insulating materials such as ceramics are drilled, cut or screwed with high dimensional accuracy and high productivity.

What is claimed is:

1. A method of electric discharge machining an insulating material, comprising the steps of:

providing a porous preformed body selected from the group of a mesh-shaped electroconductive material, fine metal wires or a complex body containing needle metal in close contact with the surface of an insulating material;

providing a work electrode at a position facing said insulating material; and machining said insulating material by electric discharge generated between said work electrode and said insulating material.

2. The electric discharge machining method according to claim 1, wherein said mesh-shaped electroconductive material is of 100 meshes or finer.

3. The electric discharge machining method according to claim 1, wherein 10 or less sheets of said mesh-shaped electroconductive material are laminated and adhered closely to the surface of the insulating material.

4. The electric discharge machining method according to claim 1, wherein the porous preformed body is made of a material selected from the group consisting of Cu, Ni, W, Nb and alloys thereof.

5. The electric discharge machining method according to claim 1, wherein the porous preformed body is made of a mesh-shaped electroconductive material and the mesh-shaped electroconductive material is fixed to the surface of the insulating material by at least one of mechanical securing, adhesion or soldering.

6. The electric discharge machining method according to claim 1, wherein the work electrode has a top end formed to a drill shape.

7. The electric discharge machining method according to claim 1, wherein the work electrode has grooves.

8. The electric discharge machining method according to claim 7, wherein said grooves are parallel to the axial direction of the work electrode.

9. The electric discharge machining method according to claim 7, wherein the grooves are spiral grooves crossing said axial direction.

10. The electric discharge machining method according to claim 1, wherein the work electrode is rotated.

11. The electric discharge machining method according to claim 1, wherein the polarity of the work electrode is inversed.

12. The electric discharge machining method according to claim 1, wherein the work electrode has a top end formed to a tapered shape.

13. The electric discharge machining method according to claim 1, wherein the work electrode is orbitally carried.

14. A method of electric discharge machining an insulating material, comprising the steps of:

a. closely adhering a mesh-shaped electroconductive material onto the surface of an insulating material;

b. providing a solid electroconductive material on said mesh-shaped electroconductive material;

c. providing a work electrode at a position facing said solid electroconductive material and said mesh-shaped electroconductive materials; and d. machining said insulating material by electric discharge generated between said work electrode and said insulating material.

15. The electric discharge machining method according to claim 14, wherein 10 or less sheets of said mesh-shaped electroconductive material are laminated and adhered closely to the surface of the insulating material.

16. The electric discharge machining method according to claim 14, wherein the mesh-shaped electroconductive material is made of a material selected from the group consisting of Cu, Ni, W, Nb and alloys thereof.

17. The electric discharge machining method according to claim 14, wherein the mesh-shaped electroconductive material is fixed to the surface of the insulating material by at least one of mechanical securing, adhesion or soldering.

18. The electric discharge machining method according to claim 14, wherein the work electrode has a top end formed to a drill shape.

19. The electric discharge machining method according to claim 14, wherein the work electrode has grooves.

20. The electric discharge machining method according to claim 14, wherein the work electrode is rotated.

21. The electric discharge machining method according to claim 14, wherein the polarity of the work electrode is inversed.

22. The electric discharge machining method according to claim 14, wherein said mesh-shaped electroconductive material is 100 meshes or finer.

23. The electric discharge machining method according to claim 14, wherein the work electrode has a top end formed to a tapered shape.

24. The electric discharge machining method according to claim 14, wherein the work electrode is orbitally carried.

* * * * *

UNITED STATES PATENT AND TRADEMARK OFFICE
CERTIFICATE OF CORRECTION

PATENT NO. : 5,569,394
DATED : October 29, 1996
INVENTOR(S) : Yasushi Fukuzawa

It is certified that error appears in the above-indentified patent and that said Letters Patent is hereby corrected as shown below:

Column 1 Line 32 after "4-41120" insert --.--.

Column 1 Line 37 "fomed" should read --formed--.

Column 1 Line 61 "tile" should read --the--.

Column 2 Line 16 "machining," should read --machining.--.

Column 5 Line 8 "obitally" should read --orbitally--.

Column 5 Line 10 "obitally" should read --orbitally--.

Column 5 Line 15 "obitally" should read --orbitally--.

Column 6 Line 30 "carvature" should read --curvature--.

Column 7 Line 22 "resitance," should read --resistance,--.

Column 7 Line 28 "electrocondutive" should read --electroconductive--.

Column 7 Line 40 "sec," should read --sec.,--.

Column 9 Line 16 "dischrage" should read --discharge--.

Column 9 Line 30 "period 16" should read --period of 16--.

UNITED STATES PATENT AND TRADEMARK OFFICE
CERTIFICATE OF CORRECTION

PATENT NO. : 5,569,394
DATED : October 29, 1996
INVENTOR(S) : Yasushi Fukuzawa

It is certified that error appears in the above-indentified patent and that said Letters Patent is hereby corrected as shown below:

Column 9 Line 38 "electrtic" should read --electric--.

Claim 1 Line 67 Column 9 "electrocondutive" should read --electroconductive--.

Signed and Sealed this

Eighth Day of April, 1997

Attest:

BRUCE LEHMAN

Attesting Officer

Commissioner of Patents and Trademarks